United States Patent
Johannesen et al.

(10) Patent No.: US 9,892,174 B2
(45) Date of Patent: Feb. 13, 2018

(54) IDENTIFICATION OF OUTLIERS

(71) Applicant: International Business Machines Corporation, Armonk, NY (US)

(72) Inventors: Leila J. Johannesen, San Jose, CA (US); Ai-chi Lu, San Jose, CA (US); Kevin M. McBride, Mountain View, CA (US); Michael L. Pauser, Morgan Hill, CA (US); David C. Tu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/870,548

(22) Filed: Sep. 30, 2015

(65) Prior Publication Data
US 2017/0091292 A1 Mar. 30, 2017

(51) Int. Cl.
*G06F 17/30* (2006.01)
*G06Q 10/06* (2012.01)
*G06T 11/20* (2006.01)
*G06F 3/0484* (2013.01)

(52) U.S. Cl.
CPC .... *G06F 17/30554* (2013.01); *G06F 3/04842* (2013.01); *G06F 17/30696* (2013.01); *G06Q 10/06* (2013.01); *G06T 11/206* (2013.01)

(58) Field of Classification Search
CPC ......... G06F 17/30554; G06F 17/30696; G06F 17/30991; G06F 3/04842; G06Q 10/06; G06T 11/206
USPC ................. 707/722; 705/7.22, 7.39; 345/440
See application file for complete search history.

(56) References Cited

U.S. PATENT DOCUMENTS

| | | | |
|---|---|---|---|
| 7,222,082 B1* | 5/2007 | Adhikari | G06Q 10/06 705/7.22 |
| 8,732,101 B1 | 5/2014 | Wilson et al. | |
| 2003/0212621 A1* | 11/2003 | Poulter | G06Q 40/06 705/36 R |
| 2006/0241949 A1* | 10/2006 | Tobias | G06Q 40/00 345/440 |
| 2010/0332346 A1 | 12/2010 | Embree | |
| 2013/0268325 A1* | 10/2013 | Dembo | G06T 11/206 705/7.39 |

(Continued)

OTHER PUBLICATIONS

Disclosed Anonymously, "Apparatus to model impact of business events as a combination of modular statistical patterns," ip.com, An IP.com Prior Art Database Technical Disclosure, IP.com No. 000236955, May 23, 2014, 7 pages.

(Continued)

*Primary Examiner* — Dung K Chau
(74) *Attorney, Agent, or Firm* — Erik K. Johnson

(57) ABSTRACT

A computer receives one or more sets of historical data points, wherein each set of historical data points corresponds to a component. The computer normalizes the one or more sets of historical data points. The computer receives and normalizes a first set of additional data points corresponding to a first set of the one or more sets and a second set of additional data points corresponding to the second set of the one or more sets. The computer creates a first visual representation corresponding to the first set of the one or more sets and the first set of additional points and a second visual representation corresponding to the second set of the one or more sets and the second set of additional data points.

20 Claims, 3 Drawing Sheets

(56) References Cited

U.S. PATENT DOCUMENTS

2014/0278065 A1* 9/2014 Ren .................. G06T 15/04
701/454
2014/0279196 A1 9/2014 Wilson et al.
2014/0280226 A1 9/2014 Wilson et al.

OTHER PUBLICATIONS

Disclosed Anonymously, "Interactive Outlier Analysis on Columnar Databases," ip.com, An IP.com Prior Art Database Technical Disclosure, IP.com No. 000203006, Jan. 14, 2011, 7 pages.
Lijun et al, "WSO-based Spatial Outlier Detection Algorithms," Journal of networks, vol. 8, No. 7, Jul. 2013, doi:10.4304/jnw.8.7. 1582-1588, pp. 1582-1588.
Jin et al, "Fast searching technique for key attribute subspace of outliers," Computer Engineering and Applications, vol. 47, No. 17, 2011, pp. 145-147. (English abstract only).
"Boxes, Whiskers, and Jitters," Data Revelations, http://www.datarevelations.com/2014/01, Jan. 2014, pp. 1-4.
SAS: The Power to Know, "SAS(R) 9.3 Graph Template Language: User's Guide: Changing Box Plot Display," http://support.sas.com/documentation/cd1/en/grstatug/63302/HTML/default/viewerhtm#p0t7zp3zwrf9q1n1k2s04du6oduc.htm, printed on Sep. 29, 2015, pp. 1-6.
"IBM Data Server Manager VI.1, a simple, scalable, smart solution, helps improve performance management and database administration for IBM DB2 for Linux, UNIX and Windows environments," IBM United States Software Announcement 215-091, dated Mar. 10, 2015, availability date Mar. 20, 2015, pp. 1-8. Grace Period Disclosure.

* cited by examiner

IDENTIFICATION OF OUTLIERS

STATEMENT ON PRIOR DISCLOSURES BY AN INVENTOR

Aspects of the present invention have been disclosed by the Applicant, who obtained the subject matter disclosed directly from the inventors, in the product, "IBM Data Server Manager V1.1, a simple, scalable, smart solution, helps improve performance management and database administration for IBM DB2 for Linux, UNIX and Windows environments," availability date Mar. 20, 2015.

TECHNICAL FIELD

The present invention relates to attributes of objects, and more particularly to the identification of outlying attributes of components.

BACKGROUND

In addition, in the digital age, devices and objects, such as computing devices and memory come in all shapes, sizes, and colors. Understanding the capabilities of devices and objects is of major importance so that one knows a proper amount of usage that a device or object can handle. Having this information can allow a person or corporation to have the capability to use devices in a more efficient manner.

SUMMARY

The present invention provides a method, system, and computer program product for creating a visual representation of normalized data. A computer receives one or more sets of historical data points, wherein each set of historical data points corresponds to a component. The computer normalizes the one or more sets of historical data points. The computer receives and normalizes a first set of additional data points corresponding to a first set of the one or more sets and a second set of additional data points corresponding to the second set of the one or more sets. The computer creates a first visual representation corresponding to the first set of the one or more sets and the first set of additional points and a second visual representation corresponding to the second set of the one or more sets and the second set of additional data points.

DETAILED DESCRIPTION

Embodiments of the present invention will now be described in detail with reference to the accompanying Figures.

Figure 1:
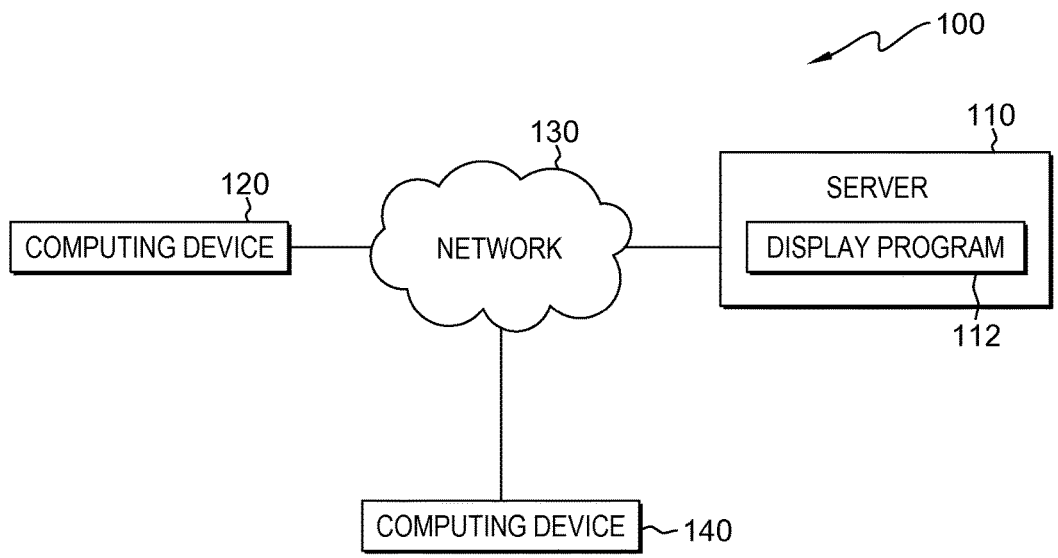
FIG. 1 illustrates a display system, in accordance with an embodiment of the invention.

FIG. 1 illustrates display system 100, in accordance with an embodiment of the invention. In an exemplary embodiment, display system 100 includes server 110, computing device 120, and computing device 140 all interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 110, computing device 120, and computing device 140.

Computing device 120 may be a desktop computer, a notebook, a laptop computer, a tablet computer, a handheld device, a smart-phone, a thin client, or any other electronic device or computing system capable of receiving and sending data to and from other computing devices, such as computing device 140 and server 110, via a network, such as network 130. Although not shown, optionally, computing device 120 can comprise a cluster of web devices executing the same software to collectively process requests.

Computing device 140 may be a desktop computer, a notebook, a laptop computer, a tablet computer, a handheld device, a smart-phone, a thin client, or any other electronic device or computing system capable of receiving and sending data to and from other computing devices, such as computing device 120 and server 110, via a network, such as network 130. Although not shown, optionally, computing device 140 can comprise a cluster of web devices executing the same software to collectively process requests.

Server 110 includes display program 112. Server 110 may be a desktop computer, a notebook, a laptop computer, a tablet computer, a handheld device, a smart-phone, a thin client, or any other electronic device or computing system capable of receiving and sending data to and from other computing devices, such as computing device 120 and computing device 140, via a network, such as network 130. Although not shown, optionally, server 110 can comprise a cluster of web devices executing the same software to collectively process requests. Server 110 is described in more detail with reference to FIG. 3.

In the example embodiment, display program 112 is a program capable of receiving information (historical information and current information) from computing devices, such as computing device 120 and computing device 140, detailing usage information, information regarding attributes of the device(s), and/or information detailing other aspects of the device(s). Furthermore, display program 112 is capable of normalizing the received information/data and displaying the normalized data graphically in order for outlier data points receives from each computing device to be identified. In addition, display program 112 is capable of receiving user input via a user interface from the user of server 110. The operations and functions of display program 112 are described in more detail with reference to FIG. 2.

Figure 2:
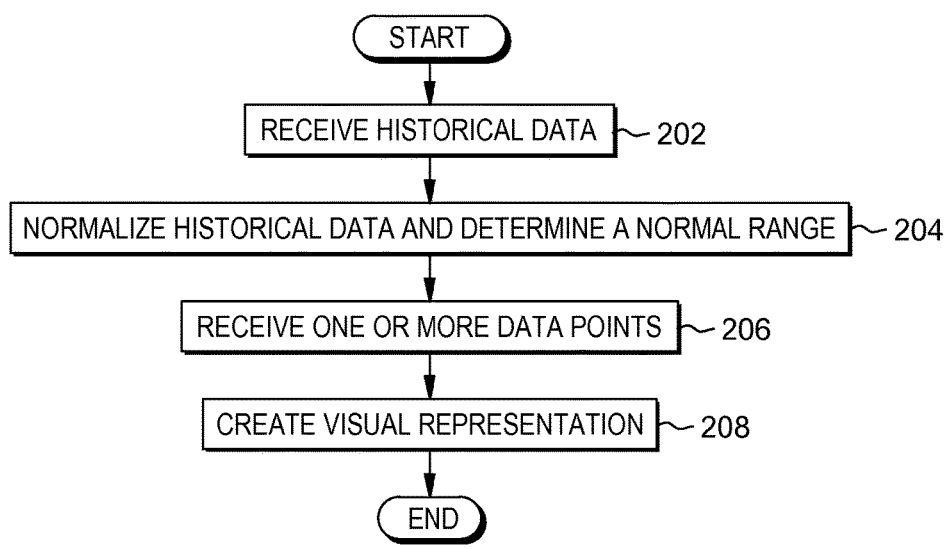
FIG. 2 is a flowchart illustrating the operations of the display program of FIG. 1, in accordance with an embodiment of the invention.

FIG. 2 is a flowchart illustrating the operations of display program 112 in normalizing data and displaying the normalized data graphically in order to identify outliers, in accordance with an embodiment of the invention. In the example embodiment, display program 112 receives historical data from one or more computing devices, such as computing device 120 and computing device 140 (step 202). In the example embodiment, display program 112 receives information detailing usage statistics and capacity constraints of computing device 120, computing device 140, and also attributes of each device. For example, display program 112 may receive information detailing historical usage of a processor of computing device 120, the capacity/capabilities of the processor, and also usage and capacity information regarding memory/storage devices present on computing device 120 (attribute of computing device 120). In addition, the historical data may have been time-stamped so that display program 112 is able to determine the period of time the data corresponds to.

Display program 112 normalizes the historical data (step 204). In the example embodiment, display program 112 normalizes the historical data and also determines a normal range for the historical data (a historical norm for the data set). In the example embodiment, normalizing the historical data allows data that may pertain to different devices to be viewed in a common scale. For example, computing device 120 may have a processor having a higher speed and higher capabilities than computing device 140, therefore normalizing the data coming from the computing devices and depicting the data on a common scale allows a user to view usage statistics on a common scale for device and attributes of varying capabilities. In another example, computing device 120 and computing device 140 may have similar or the same processor speeds and capabilities, however, computing device 140 may be a failover device for computing device 120, and therefore, computing device 140 may have a usage statistics that are lower than computing device 120 (due to computing device 140 being idle at times waiting for failover). In this example, normalizing the historical data for each device still allows the data (usage statistics) to be viewed on a common scale.

In the example embodiment, display program 112 determines a normal range through standard deviation calculations. In the example embodiment, display program 112, normalizes the historical data, determines an average of the normalized data, and then determines a standard deviation of the normalized data set with respect to the historical average in order to determine a normal range. For example, if the historical data set is normalized with the normalized data set including 40, 40, 40, 45, 50, and 55, display program 112 determines the average of the normalized data set to be 45. Display program then determines the standard deviation for the data set, which is approximately 5.77. In the example embodiment, the normal range is defined as two standard deviations from the historical average. Therefore, the normal range is 11.54 above and below 45. In other embodiments, the normal range may be defined as a different number of standard deviations from the historical average.

In another embodiment, display program 112 may identify the top and bottom of the normal range to be a certain percent of the historical average. In the example embodiment, the top is 110% of the historical average, while the bottom of the normal range is 90% of the historical average. In other embodiments, the top and bottom of the normal range may be another percentage. In even further embodiments, the top and bottom of the normal range may be a percentage range above and below the historical average or alternatively, the normalization may be conducted in other known manners other than by utilizing standard deviation and percentages.

In yet another embodiment, the top and bottom of the normal range may be defined by user input via a user interface. The normal range and the utilization and depiction of the normal range by display program 112 is defined in greater detail below with regard to FIG. 3.

In the example embodiment, display program 112 receives one or more data points from the one or more computing devices associated with the historical data (step 206). In the example embodiment, the one or more data points may be a representation of real time information such as usage statistics of the computing device (with regard to capacity/capability of the device). In the example embodiment, display program 112 normalizes the one or more data points in the same manner as the historical data. In an embodiment, the one or more received data points may represent information associated with a previous time period, such as past usage statistics pertaining to a certain period of time that has already passed.

Display program 112 creates a visual representation of the one or more points (step 208). In the example embodiment, display program 112 creates a visual representation by graphically depicting the normal range within a larger range, with the larger range being input by an administrator, a developer or a user. The normal range may be depicted in manner so that it is readily apparent to a viewer of the visual representation (such as shading in the area of the larger range that represents the normal range). Referring to the example above, the normal range of two standard deviations (or 11.54) above and below 45 (i.e., 33.46 to 56.54) may be graphically depicted in a larger range of five standard deviations (28.85) above and below 45 (i.e., 16.15 to 73.85). In addition, the one or more points, for example, the points 42 and 20 may be additionally depicted on the visual representation. In this example, 42 is within the normal range, while 20 is an outlier (i.e., not in the normal range). Therefore, display program 112 may further highlight the outlier by changing the color of the depicted point. By visual depicting each received point against the visual representation of the normal range, a viewer of the visual representation is able to recognize an outlier. Furthermore, an administrator or developer may initially set the larger range to a specific range, however, a user may be given the option to alter the larger range to be a wider or narrower range. In the example embodiment, if the user chooses to alter the larger range, the larger range may be changed for all attributes across all computing devices so that visual representations of all attributes are depicted in a similar manner.

Figure 3:
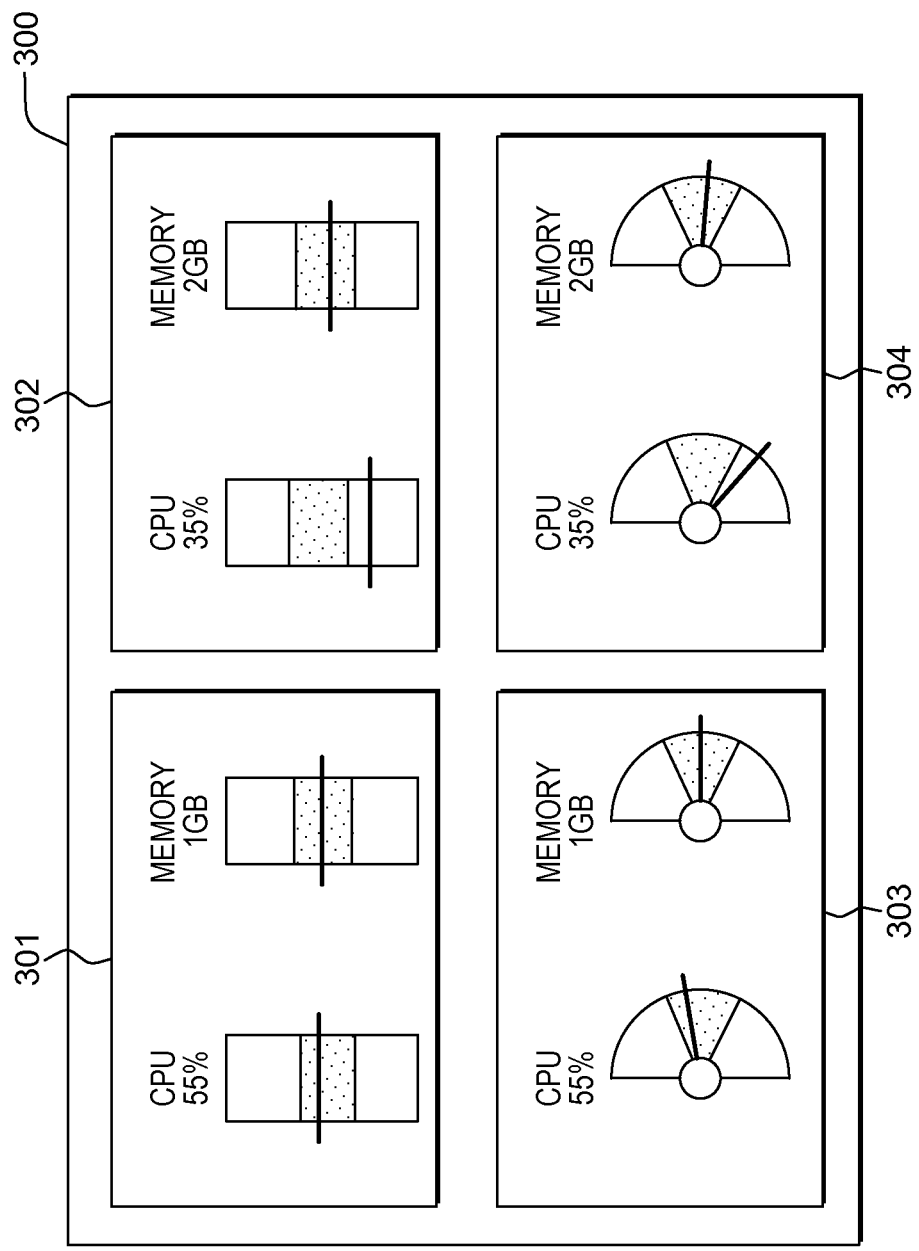
FIG. 3 is an illustration of the display of normalized data in determining an outlier, in accordance with an embodiment of the invention.

FIG. 3 is an illustration of the display of normalized data in determining an outlier, in accordance with an embodiment of the invention. In the example embodiment, display is the display, such as on a monitor, on server 110 depicting the normalized data for computing device 120 and computing device 140. In the example embodiment, visual representation 301 and visual representation 303 depict an example set of normalized data shown graphically. Visual representation 301 and visual representation 303 illustrate processor usage data associated with computing device 120 and memory usage (for example, RAM or persistent storage) located on computing device 120. In the example embodiment, the top and bottom of the larger range (depiction range) is 5 standard deviations above and below the respective average or the processor usage data and for the memory usage. Furthermore, the normal range for the usage data and the memory usage is 2 standard deviations above and below the respective average.

In the example embodiment, visual representation 302 and 304 depict an example set of normalized data corresponding to computing device 140. As illustrated, the top and bottom of the larger range (depiction range) for the processor and memory usage is the same as computing device 120 in terms of standard deviation, however, the raw values represented by the standard deviations are different.

In the example embodiment, the larger range for the memory usage and the computing device usage is 5 standard deviations above and below the respective average. In addition, the normal range for the computing device usage data and memory usage data is 2 standard deviations above and below the respective average. As depicted in visual representation 302 and 304, a data point, which is a normalized representation of a raw usage data point of 35%, is visible as not within the normal range with regard to the processor usage data of computing device 104, while the data points with regard to the processor usage data of computing device 120 and the usage data of both memory devices are shown as within the normal range. Therefore, a viewer of the visual representations is able to quickly detect an outlier (data point at 35%), which is outside the normal range of 2 standard deviations above and below the average.

In addition, a visual representation such as the visual representation shown in FIG. 3 may allow a user of server 110 to see multiple outliers and also see which outlier(s) is the most extreme. For example, a visual representation, such as the representation illustrated in FIG. 3, may show that both computing device 120 and computing device 140 have outliers with regard to CPU usage. For example, with the normal range being 2 standard deviations above and below the respective average, there may be an outlier (with regard to computing device 140) that is just slightly above 2 standard deviations from the averages, while there may also be an outlier (with regard to computing device 120) that is 5 standard deviations from the average. The visual representation of the CPU usage of each of the computing devices allows the user of server 110 to identify the two outliers and also that the outlier associated with computing device 120 is more severe and therefore may require more immediate attention.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
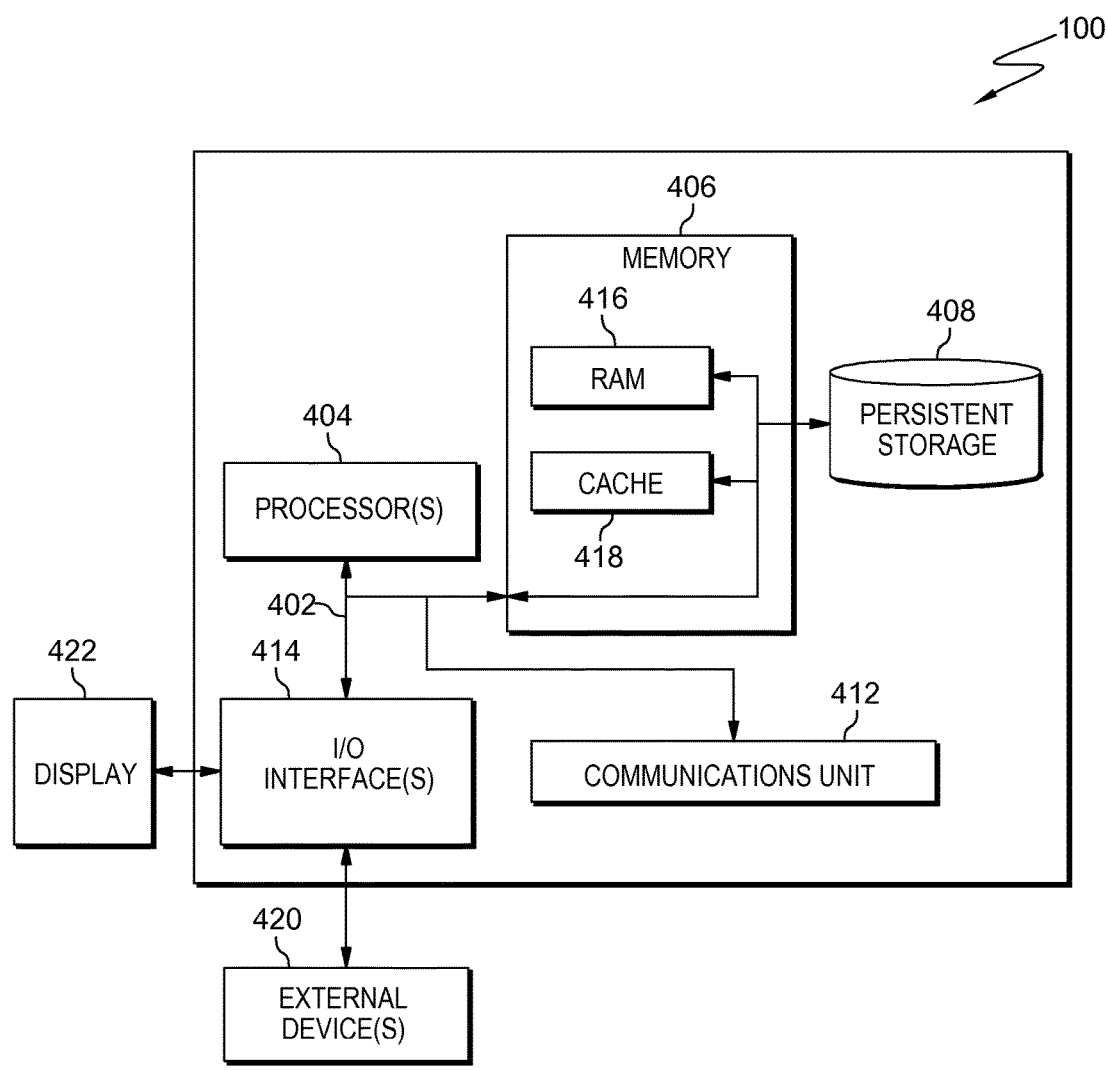
FIG. 4 is a block diagram depicting the hardware components of the display system of FIG. 1, in accordance with an embodiment of the invention.

FIG. 4 depicts a block diagram of components of server 110, computing device 120, and computing device 140 of display system 100 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 110, computing device 120, and computing device 140 include communications fabric 502, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

Display program 112 in server 110 may be stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Display program 112 in sever 110 may be downloaded to persistent storage 408 through communications unit 412.

I/O interface(s) 414 allows for input and output of data with other devices that may be connected to server 110, computing device 120, and computing device 140. For example, I/O interface 414 may provide a connection to external devices 420 such as, a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., display program 112 in server 110, can be stored on such portable computer-readable storage media and can be loaded onto persistent storage 408 via I/O interface(s) 414. I/O interface(s) 414 can also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a visual representation of normalized data, comprising the steps of:
   a computer receiving one or more sets of historical data points, wherein each set of historical data points corresponds to a component;
   the computer normalizing the one or more sets of historical data points, wherein normalizing the one or more sets of historical data points includes determining a larger range for each set of the one or more sets that includes all normalized historical data points contained within each respective set, and determining a normal range for each set of the one or more sets which represent a normalized data range that corresponds to a historical norm for the component corresponding to each respective set;

the computer receiving a first set of additional data points corresponding to a first set of the one or more sets and a second set of additional data points corresponding to the second set of the one or more sets;

the computer normalizing the first set of additional data points and the second set of additional data points; and the computer creating a first visual representation, wherein the first visual representation visually depicts a larger range of the first set of the one or more sets, a normal range of the first set of the one or more sets, and the normalized first set of additional data points; and the computer creating a second visual representation, wherein the second visual representation visually depicts a larger range of the second set of the one or more sets, a normal range of the second set of the one or more sets, and the normalized second set of additional data points, and wherein the visual depiction of the larger range and the normal range corresponding to the first visual representation is visually identical to the depiction of the larger range and the normal range corresponding to the second visual representation.

2. The method of claim 1, wherein the step of the computer normalizing the one or more sets of historical data points further comprises:

the computer determining an average for the historical data points contained in each set of the one or more sets; and the computer determining a standard deviation for each set of the one or more sets.

3. The method of claim 2, wherein the normal range corresponding to the first visual representation and the normal range corresponding to the second visual representation is two standard deviations, and wherein the larger range corresponding to the first visual representation and the larger range corresponding to the second visual representation is five standard deviations.

4. The method of claim 1, wherein the normal range and larger range corresponding to each set of the one or more sets may be altered by user input.

5. The method of claim 1, wherein the normal range and the larger range corresponding to each set of the one or more sets may be expressed as a percentage ranges above and below a historical average associated with each set of the one or more sets.

6. The method of claim 1, wherein a visual depiction of the first set of the one or more sets and the first set of additional data points is not identical to a visual depiction of the second set of the one or more sets and the second set of additional data points.

7. The method of claim 1, further comprising:

the computer determining that a first normalized point of the normalized first set of additional data points is not within the normal range corresponding to the first set of the one or more sets; and the computer visually emphasizing the first normalized point within the first visual representation.

8. A computer program product for creating a visual representation of normalized data, the computer program product comprising:

one or more computer-readable storage devices and program instructions stored on at least one of the one or more computer-readable storage devices, the program instructions comprising:

program instructions to receive one or more sets of historical data points, wherein each set of historical data points corresponds to a component;

program instructions to normalize the one or more sets of historical data points, wherein normalizing the one or more sets of historical data points includes program instructions to determine a larger range for each set of the one or more sets that includes all normalized historical data points contained within each respective set, and program instructions to determine a normal range for each set of the one or more sets which represent a normalized data range that corresponds to a historical norm for the component corresponding to each respective set;

program instructions to receive a first set of additional data points corresponding to a first set of the one or more sets and a second set of additional data points corresponding to the second set of the one or more sets;

program instructions to normalize the first set of additional data points and the second set of additional data points; and program instructions to create a first visual representation, wherein the first visual representation visually depicts a larger range of the first set of the one or more sets, a normal range of the first set of the one or more sets, and the normalized first set of additional data points; and program instructions to create a second visual representation, wherein the second visual representation visually depicts a larger range of the second set of the one or more sets, a normal range of the second set of the one or more sets, and the normalized second set of additional data points, and wherein the visual depiction of the larger range and the normal range corresponding to the first visual representation is visually identical to the depiction of the larger range and the normal range corresponding to the second visual representation.

9. The computer program product of claim 8, wherein the program instructions to normalize the one or more sets of historical data points further comprises:

program instructions to determine an average for the historical data points contained in each set of the one or more sets; and program instructions to determine a standard deviation for each set of the one or more sets.

10. The computer program product of claim 9, wherein the normal range corresponding to the first visual representation and the normal range corresponding to the second visual representation is two standard deviations, and wherein the larger range corresponding to the first visual representation and the larger range corresponding to the second visual representation is five standard deviations.

11. The computer program product of claim 8, wherein the normal range and larger range corresponding to each set of the one or more sets may be altered by user input.

12. The computer program product of claim 8, wherein the normal range and the larger range corresponding to each set of the one or more sets may be expressed as a percentage ranges above and below a historical average associated with each set of the one or more sets.

13. The computer program product of claim 8, wherein a visual depiction of the first set of the one or more sets and the first set of additional data points is not identical to a visual depiction of the second set of the one or more sets and the second set of additional data points.

14. The computer program product of claim 8, further comprising:
   program instructions to determine that a first normalized point of the normalized first set of additional data points is not within the normal range corresponding to the first set of the one or more sets; and
   program instructions to visually emphasize the first normalized point within the first visual representation.

15. A computer system for creating a visual representation of normalized data, the computer system comprising:
   one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
      program instructions to receive one or more sets of historical data points, wherein each set of historical data points corresponds to a component;
      program instructions to normalize the one or more sets of historical data points, wherein normalizing the one or more sets of historical data points includes program instructions to determine a larger range for each set of the one or more sets that includes all normalized historical data points contained within each respective set, and program instructions to determine a normal range for each set of the one or more sets which represent a normalized data range that corresponds to a historical norm for the component corresponding to each respective set;
      program instructions to receive a first set of additional data points corresponding to a first set of the one or more sets and a second set of additional data points corresponding to the second set of the one or more sets;
      program instructions to normalize the first set of additional data points and the second set of additional data points; and
      program instructions to create a first visual representation, wherein the first visual representation visually depicts a larger range of the first set of the one or more sets, a normal range of the first set of the one or more sets, and the normalized first set of additional data points; and
      program instructions to create a second visual representation, wherein the second visual representation visually depicts a larger range of the second set of the one or more sets, a normal range of the second set of the one or more sets, and the normalized second set of additional data points, and wherein the visual depiction of the larger range and the normal range corresponding to the first visual representation is visually identical to the depiction of the larger range and the normal range corresponding to the second visual representation.

16. The computer system of claim 15, wherein the program instructions to normalize the one or more sets of historical data points further comprises:
   program instructions to determine an average for the historical data points contained in each set of the one or more sets; and
   program instructions to determine a standard deviation for each set of the one or more sets.

17. The computer system of claim 16, wherein the normal range corresponding to the first visual representation and the normal range corresponding to the second visual representation is two standard deviations, and wherein the larger range corresponding to the first visual representation and the larger range corresponding to the second visual representation is five standard deviations.

18. The computer system of claim 15, wherein the normal range and larger range corresponding to each set of the one or more sets may be altered by user input.

19. The computer system of claim 15, wherein a visual depiction of the first set of the one or more sets and the first set of additional data points is not identical to a visual depiction of the second set of the one or more sets and the second set of additional data points.

20. The computer system of claim 15, further comprising:
   program instructions to determine that a first normalized point of the normalized first set of additional data points is not within the normal range corresponding to the first set of the one or more sets; and
   program instructions to visually emphasize the first normalized point within the first visual representation.

* * * * *